US012451085B2

(12) United States Patent
Song et al.

(10) Patent No.: US 12,451,085 B2
(45) Date of Patent: Oct. 21, 2025

(54) DISPLAY DEVICE AND METHOD OF DRIVING THE SAME

(71) Applicant: Samsung Display Co., LTD., Yongin-si (KR)

(72) Inventors: Hyunseop Song, Yongin-si (KR); Sun-Koo Kang, Yongin-si (KR); Youngbin Kim, Yongin-si (KR); Byungchul Shin, Yongin-si (KR); Eunjeong Cho, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/603,409

(22) Filed: Mar. 13, 2024

(65) Prior Publication Data

US 2024/0379069 A1 Nov. 14, 2024

(30) Foreign Application Priority Data

May 12, 2023 (KR) ........................ 10-2023-0061832

(51) Int. Cl.
*G09G 3/3291* (2016.01)
*G09G 3/32* (2016.01)

(52) U.S. Cl.
CPC ............. *G09G 3/3291* (2013.01); *G09G 3/32* (2013.01); *G09G 2310/027* (2013.01); *G09G 2310/0275* (2013.01); *G09G 2320/0247* (2013.01)

(58) Field of Classification Search
CPC .. G09G 3/3291; G09G 3/32; G09G 2310/027; G09G 2310/0275; G09G 2320/0247
USPC .......................................................... 345/204
See application file for complete search history.

(56) References Cited

U.S. PATENT DOCUMENTS

| | | | | |
|---|---|---|---|---|
| 8,111,229 B2 * | 2/2012 | Song | G09G 3/3688 | 345/99 |
| 8,319,717 B2 * | 11/2012 | Kim | G09G 3/3614 | 345/99 |
| 8,552,968 B2 * | 10/2013 | Chung | G09G 3/3406 | 362/97.2 |
| 2007/0296668 A1 * | 12/2007 | Kim | G09G 3/3611 | 345/89 |
| 2011/0157260 A1 * | 6/2011 | Pyun | H04N 13/398 | 345/691 |

(Continued)

FOREIGN PATENT DOCUMENTS

| | | |
|---|---|---|
| KR | 100553335 B1 | 2/2006 |
| KR | 1020210024359 A | 3/2021 |

*Primary Examiner* — Kwin Xie
(74) *Attorney, Agent, or Firm* — CANTOR COLBURN LLP

(57) ABSTRACT

A display device includes a display panel including pixels, a data driver which applies a dithering data voltage to the display panel, and a driving controller which determines whether to perform a dithering operation of applying the dithering data voltage to the display panel based on input image data. The display device alternately changes the dithering data voltage in units of one frame when the dithering operation is performed at a first dithering frequency or a third dithering frequency, and alternately changes the dithering data voltage in units of N frames when the dithering operation is performed at a second dithering frequency.

19 Claims, 14 Drawing Sheets

(56) References Cited

U.S. PATENT DOCUMENTS

| | | | | |
|---|---|---|---|---|
| 2015/0170609 A1* | 6/2015 | Jung | ........................ | G09G 3/20 345/212 |
| 2017/0092178 A1* | 3/2017 | Lee | ...................... | H10D 86/471 |
| 2019/0180695 A1* | 6/2019 | Ha | ....................... | G09G 3/2051 |

* cited by examiner

DISPLAY DEVICE AND METHOD OF DRIVING THE SAME

This application claims priority to Korean Patent Application No. 10-2023-0061832, filed on May 12, 2023, and all the benefits accruing therefrom under 35 U.S.C. § 119, the content of which in its entirety is herein incorporated by reference.

BACKGROUND

1. Field

Embodiments of the invention relate to a display device and a method of driving the display device. More particularly, embodiments of the invention relate to a display device and a method of driving the display device for performing a dithering operation.

2. Description of the Related Art

Generally, a display device may include a display panel and a display panel driver. The display panel may include gate lines, data lines, and pixels. The display panel driver may include a gate driver for providing gate signals to the gate lines, a data driver for providing data voltages to the data lines, and a driving controller for controlling the gate driver and the data driver.

The display device may use a data driver which has a data processing capability less than the number of bits of input image data received by the driving controller to reduce costs. The data driver may perform a dithering operation to represent the number of bits of the input image data. A dithering data voltage, which is a data voltage provided to each of the pixels when the dithering operation is performed, may alternately change in units of one frame.

SUMMARY

In a display device configured to perform a dithering operation, when a dithering data voltage alternately changes in units of one frame, luminance deviation of a display panel may occur. The luminance deviation of the display panel may increase depending on a dithering frequency, at which the dithering operation is performed, and a flicker, where the luminance deviation of the display panel is visible by the user, may occur.

Embodiments of the invention provide a display device which improves display quality of a display panel.

Embodiments of the invention provide a method of driving the display device.

In an embodiment of a display device according to the invention, the display device includes a display panel including pixels, a data driver which applies a dithering data voltage to the display panel, and a driving controller which determines whether to perform a dithering operation of applying the dithering data voltage to the display panel based on input image data. In such an embodiment, when the dithering operation is performed at a first dithering frequency or a third dithering frequency, which is less than the first dithering frequency, the dithering data voltage is alternately applied to the display panel in units of one frame, and when the dithering operation is performed at a second dithering frequency, which is less than the first dithering frequency and greater than the third dithering frequency, the dithering data voltage is alternately applied to the display panel in units of N frames, where N is a natural number of 2 or greater.

In an embodiment, a flicker value of the first dithering frequency and a flicker value of the third dithering frequency may be greater than a flicker value of the second dithering frequency.

In an embodiment, when N increases, the flicker value of the second dithering frequency may decrease.

In an embodiment, when the dithering operation is performed at the second dithering frequency, the dithering data voltage may be a first dithering data voltage in first to N-th frames and may be a second dithering data voltage which is different from the first dithering data voltage in (N+1)-th to 2N-th frames.

In an embodiment, a target grayscale may be determined based on the first dithering data voltage and the second dithering data voltage.

In an embodiment, a dithering data voltage corresponding to the target grayscale may be a voltage between the first dithering data voltage and the second dithering data voltage.

In an embodiment, the first dithering data voltage may be greater than the second dithering data voltage.

In an embodiment, the second dithering data voltage may be greater than the first dithering data voltage.

In an embodiment, when the second dithering frequency decreases, a value of N may decrease.

In an embodiment, when a grayscale of the input image data changes, the first dithering frequency, the second dithering frequency, and the third dithering frequency may be changed.

In an embodiment, when the grayscale of the input image data increases, the second dithering frequency may decrease.

In an embodiment, when the grayscale of the input image data increases, a difference between a maximum frequency of the second dithering frequency and a minimum frequency of the second dithering frequency may decrease.

In an embodiment of a method of driving the display device according to the invention, the method includes determining whether to perform a dithering operation of applying a dithering data voltage to a display panel based on input image data, alternately applying the dithering data voltage to the display panel in units of one frame when the dithering operation is performed at a first dithering frequency or a third dithering frequency, which is less than the first dithering frequency, and alternately applying the dithering data voltage to the display panel in units of N frames when the dithering operation is performed at a second dithering frequency, which is less than the first dithering frequency and greater than the third dithering frequency, where N is a natural number of 2 or greater.

In an embodiment, a flicker value of the first dithering frequency and a flicker value of the third dithering frequency may be greater than a flicker value of the second dithering frequency.

In an embodiment, when a value of N increases, the flicker value of the second dithering frequency may decrease.

In an embodiment, when the dithering operation is performed at the second dithering frequency, the dithering data voltage may be a first dithering data voltage in first to N-th frames and may be a second dithering data voltage which is different from the first dithering data voltage in (N+1)-th to 2N-th frames.

In an embodiment, a target grayscale may be determined based on the first dithering data voltage and the second dithering data voltage.

In an embodiment, a dithering data voltage corresponding to the target grayscale may be a voltage between the first dithering data voltage and the second dithering data voltage.

In an embodiment, the first dithering data voltage may be greater than the second dithering data voltage.

In an embodiment, the second dithering data voltage may be greater than the first dithering data voltage.

In the display device and the method of driving the display device according to embodiments, when the dithering operation is performed at the first dithering frequency or the third dithering frequency, the dithering data voltage may alternately change in units of one frame, and when the dithering operation is performed at the second dithering frequency, the dithering data voltage may alternately change in units of N frames. Accordingly, in such embodiment, the dithering frequency of the dithering operation at the second dithering frequency may be substantially reduced by 1/N times the second dithering frequency, so that the display device may be substantially driven at the third dithering frequency when performing the dithering operation at the second dithering frequency, and flicker may be reduced.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
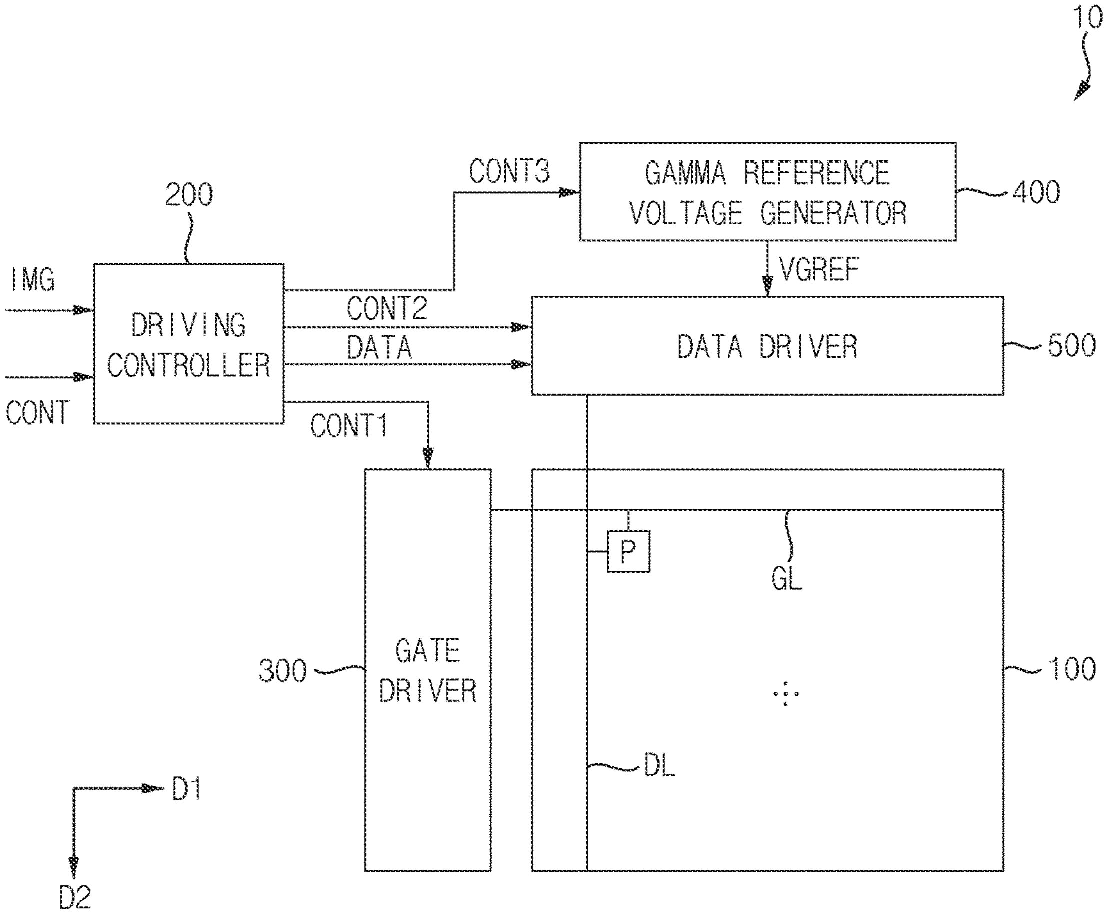
FIG. 1 is a block diagram illustrating a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a block diagram illustrating a display device according to embodiments of the invention.

Referring to FIG. 1, an embodiment of a display device 10 may include a display panel 100 and a display panel driver. The display panel driver may include a driving controller 200, a gate driver 300, a gamma reference voltage generator 400, and a data driver 500.

In an embodiment, for example, the driving controller 200 and the data driver 500 may be integrally formed into a single unit (e.g., module or chip). In an embodiment, for example, the driving controller 200, the gamma reference voltage generator 400, and the data driver 500 may be integrally formed into a single unit (e.g., module or chip). In an embodiment, for example, the driving controller 200, the gate driver 300, the gamma reference voltage generator 400, and the data driver 500 may be integrally formed into a single unit (e.g., module or chip). A driving module including at least the driving controller 200 and the data driver 500, which are integrally formed thereinto, may be referred to as a timing controller embedded data driver (TED).

The display panel 100 may include a display region for displaying an image and a peripheral region disposed adjacent to the display region.

In an embodiment, for example, the display panel 100 may be an organic light emitting diode display panel including organic light emitting diodes. In an embodiment, for example, the display panel 100 may be a quantum-dot organic light emitting diode display panel including organic light emitting diodes and quantum-dot color filters. In an embodiment, for example, the display panel 100 may be a quantum-dot nano light emitting diode display panel including nano light emitting diodes and quantum-dot color filters.

The display panel 100 may include gate lines GL, data lines DL, and pixels P electrically connected to the gate lines GL and the data lines DL. The gate lines GL may extend in a first direction D1, and the data lines DL may extend in a second direction D2 crossing the first direction D1.

The driving controller 200 may receive input image data IMG and an input control signal CONT from an external device. In an embodiment, for example, the input image data IMG may include red image data, green image data, and blue image data. The input image data IMG may further include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or the data driver 500.

The data driver 500 may receive the second control signal CONT2 and the data signal DATA from the driving controller 200 and receive the gamma reference voltage VGREF from the gamma reference voltage generator 400. The data driver 500 may convert the data signal DATA into a data voltage in analog form. The data driver 500 may output the data voltage to the data line DL.

Figure 2:
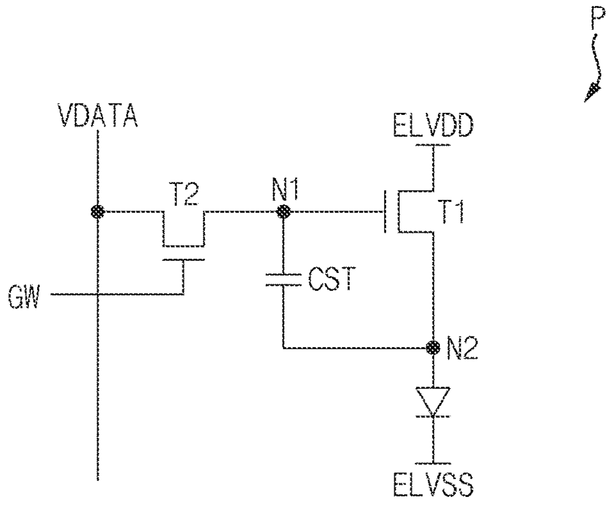
FIG. 2 is a circuit diagram illustrating an example of a pixel of a display panel of FIG. 1.

FIG. 2 is a circuit diagram illustrating an example of a pixel of a display panel of FIG. 1.

Referring to FIG. 2, in an embodiment, a pixel P may include a first transistor T1, a second transistor T2, a storage capacitor CST, and a light emitting element EE.

The first transistor T1 may provide a driving current to the light emitting element EE. In an embodiment, for example, the first transistor T1 may include a gate electrode connected to a first node N1, a first electrode that receives a first power voltage ELVDD, and a second electrode connected to a second node N2.

The second transistor T2 may provide a data voltage VDATA to the first node N1 in response to a write signal GW. In an embodiment, for example, the second transistor T2 may include a gate electrode that receives the write signal GW, a first electrode connected to a data line DL, and a second electrode connected to the first node N1.

In an embodiment, as shown in FIG. 2, each of the first transistor T1 and the second transistor T2 may be an N-type transistor (e.g., n-channel metal-oxide semiconductor (NMOS) transistor). However, the invention is not limited thereto. In an embodiment, each of the first transistor T1 and the second transistor T2 may be a P-type transistor (e.g., p-channel metal-oxide semiconductor (PMOS) transistor).

The storage capacitor CST may maintain a voltage between the first node N1 and the second node N2. The storage capacitor CST may include a first electrode connected to the first node N1 and a second electrode connected to the second node N2.

In an embodiment, as shown in FIG. 2, the pixel P may include two transistors and a single capacitor. However, the invention is not limited thereto. In an embodiment, the pixel P may include three or more transistors and/or two or more capacitors.

The light emitting element EE may emit light based on the driving current. The light emitting element EE may include a first electrode connected to the second node N2 and a second electrode that receives a second power voltage ELVSS. The second power voltage ELVSS may be smaller than the first power voltage ELVDD.

Figure 3:
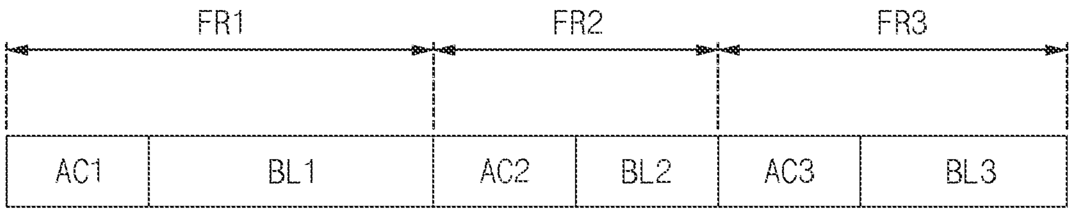
FIG. 3 is a conceptual diagram illustrating normal mode and variable frequency mode.

FIG. 3 is a conceptual diagram illustrating normal mode and variable frequency mode.

Referring to FIG. 3, in an embodiment, a display panel 100 may operate in a normal mode or a variable frequency mode.

In the normal mode, the display panel 100 may operate at a fixed input frequency (i.e., a fixed frame frequency of the display panel 100) (e.g., about 120 hertz (Hz)). In the variable frequency mode, the display panel 100 may operate at a variable frame frequency.

In the normal mode, an external device may provide input image data IMG to a driving controller 200 at the fixed input frequency, and the display panel 100 may operate at the fixed input frequency. That is, the driving controller 200 may control a data driver 500 and a gate driver 300 to drive the display panel 100 at the fixed input frequency.

As shown in FIG. 3, in the variable frequency mode, the external device may change a time length of a blank period BL1, BL2, BL3 every frame and provide the input image data IMG to the driving controller 200 at variable input frequency. A frame frequency of the display panel 100 may dynamically change based on the variable input frequency. That is, the driving controller 200 may control the gate driver 300 and the data driver 500 to drive the display panel 100 at the variable input frequency. In an embodiment, for example, the variable input frequency may change in a range from about 1 Hz to about 120 Hz, but is not limited thereto. In an embodiment, for example, the variable frequency mode may be a Free-Sync mode, a G-Sync mode, etc., but is not limited thereto.

The blank period BL1, BL2, BL3 may be a period, in which a data voltage VDATA is not provided to a pixel P.

A first frame FR1 having a first frequency may include a first active period AC1 and a first blank period BL1. A second frame FR2 having a second frequency different from the first frequency may include a second active period AC2 and a second blank period BL2. A third frame FR3 having a third frequency different from the first frequency and the second frequency may include a third active period AC3 and a third blank period BL3.

The first active period AC1 may have a same length as the second active period AC2. The first blank period BL1 may have a different length from the second blank period BL2.

The second active period AC2 may have a same length as the third active period AC3. The second blank period BL2 may have a different length from the third blank period BL3.

The display device 10 supporting (or configured to operate in) the variable frequency mode may have a writing period, in which the data voltage VDATA is written in the pixel P, and a holding period, in which the data voltage VDATA is not written in the pixel P and the pixel P only emits light. The writing period may be defined within the active periods AC1, AC2, AC3. The holding period may be defined within the blank periods BL1, BL2, BL3.

Figure 4:
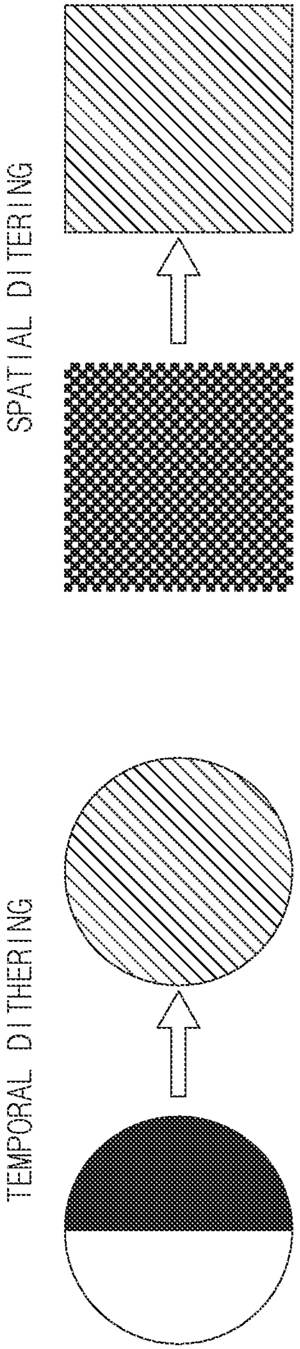
FIG. 4 is a conceptual diagram illustrating an example of a dithering operation.

FIG. 4 is a conceptual diagram illustrating an example of a dithering operation.

Referring to FIG. 4, in an embodiment, a display device 10 may use a data driver 500 having a data processing capability smaller than the number of bits of input image data IMG to reduce costs. In an embodiment, for example, when the input image data IMG has 8 bits, the display device 10 may use the data driver 500 which has a data processing capability of 7 bits, which is smaller than 8 bits. Even if the data driver 500 has the data processing capability of 7 bits, the display device 10 may display a grayscale of 8 bits by performing a dithering operation.

In an embodiment, the driving controller 200 may generate a data signal DATA by temporally dithering the input image data IMG. The driving controller 200 may generate the data signal DATA by spatially dithering the input image data IMG.

In an embodiment, for example, the data driver 500 may display 126 grayscale and 128 grayscale, but may not display 127 grayscale. In this case, a target grayscale may be 127 grayscale. The target grayscale may be a grayscale desired or intended to be displayed by the display device 10 using the data driver 500. The driving controller 200 may dither 126 grayscale of the input image data IMG and 128 grayscale of the input image data IMG to display 127 grayscale. In an embodiment, for example, as shown in FIG. 4, the driving controller 200 may temporally dither the input image data IMG so that a pixel P may display 126 grayscale in a first frame and the pixel P may display 128 grayscale in a second frame. In this case, an overall grayscale displayed on the display panel 100 in the first frame and the second frame due to the dithering operation may be 127 grayscale.

In an embodiment, for example, as shown in FIG. 4, the driving controller 200 may spatially dither the input image data IMG, half of the pixels P may display 126 grayscale, and remaining half of the pixels P may display 128 grayscale. In this case, an overall grayscale displayed on the display panel 100 by the dithering operation may be 127 grayscale.

In an embodiment, as described above, the driving controller 200 may determine whether to perform the dithering operation based on the input image data IMG and the data processing capability of the data driver 500.

Figure 5:
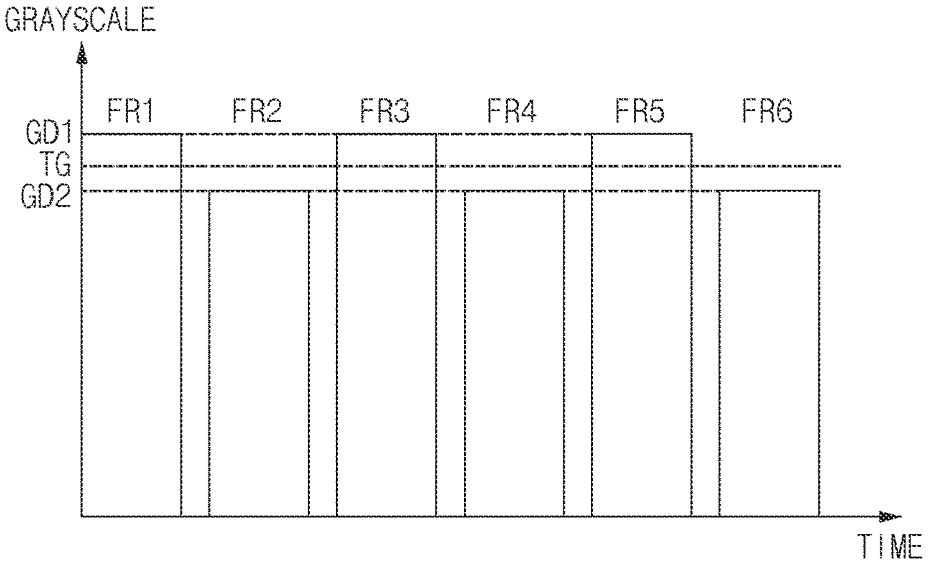
FIG. 5 is a conceptual diagram illustrating an example of target grayscale.
Figure 6:
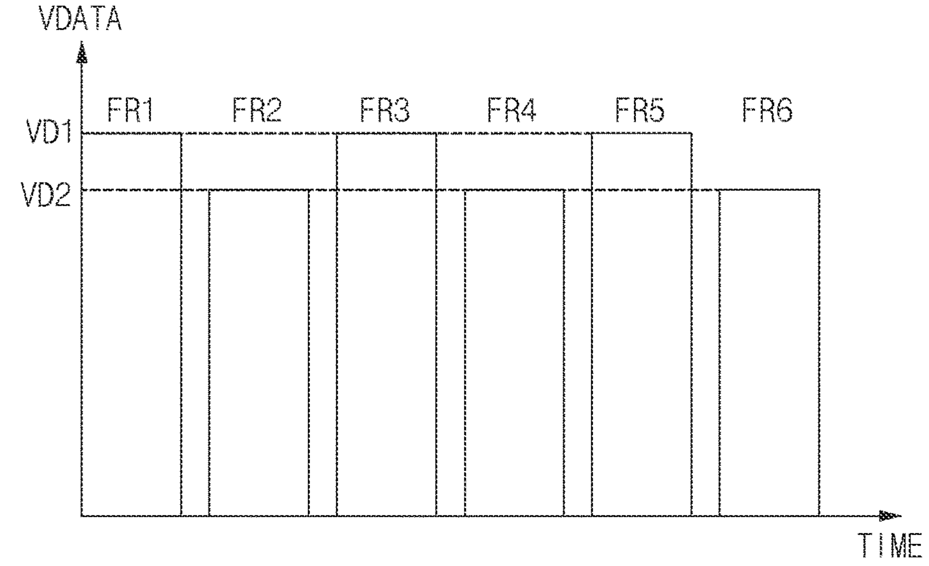
FIG. 6 is a conceptual diagram illustrating an example of a dithering data voltage representing a target grayscale of FIG. 5.

FIG. 5 is a conceptual diagram illustrating an example of target grayscale. FIG. 6 is a conceptual diagram illustrating an example of a dithering data voltage representing a target grayscale of FIG. 5.

Referring to FIGS. 5 and 6, a target grayscale TG may be determined based on a first dithering grayscale GD1 and a second dithering grayscale GD2. In an embodiment, for example, as shown in FIG. 5, a first frame FR1, a third frame FR3, and a fifth frame FR5 may have the first dithering grayscale GD1 and a second frame FR2, a fourth frame FR4, and a sixth frame FR6 may have the second dithering grayscale GD2. In this case, the target grayscale TG may be an average grayscale of the first dithering grayscale GD1 and the second dithering grayscale GD2. As shown in FIG. 6, a data driver 500 may generate a first dithering data voltage VD1 based on the first dithering grayscale GD1 and a second dithering data voltage VD2 based on the second dithering grayscale GD2. Therefore, the target grayscale TG may be determined based on the first dithering data voltage VD1 and the second dithering data voltage VD2, and a dithering data voltage corresponding to the target grayscale TG may be a voltage between the first dithering data voltage VD1 and the second dithering data voltage VD2.

For example, as shown in FIG. 5, the first dithering grayscale GD1 may be greater than the second dithering grayscale GD2. Alternatively, the second dithering grayscale GD2 may be greater than the first dithering grayscale GD1. For example, as shown in FIG. 6, the first dithering data voltage VD1 may be greater than the second dithering data voltage VD2. Alternatively, the second dithering data voltage VD2 may be greater than the first dithering data voltage VD1.

Figure 7:
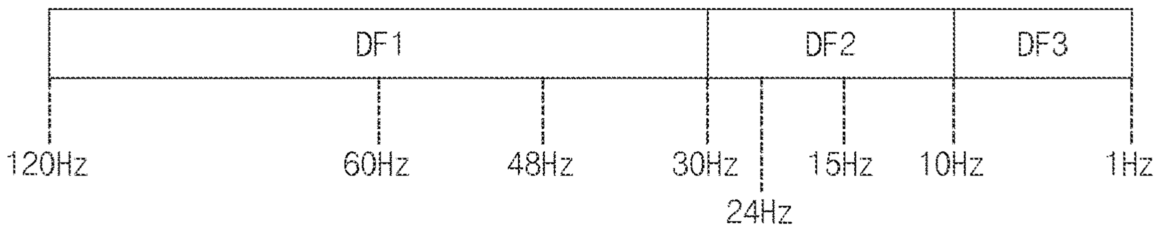
FIG. 7 is a conceptual diagram illustrating an example of a dithering frequency.

FIG. 7 is a conceptual diagram illustrating an example of a dithering frequency.

Referring to FIG. 7, a display device 10 according to embodiments of the invention may perform a dithering operation to improve data processing capability of a data driver 500. The dithering operation may be performed (or set to be performed) at a first dithering frequency DF1, a second dithering frequency DF2, or a third dithering frequency DF3. Accordingly, a display panel 100 may be operated at the first dithering frequency DF1, the second dithering frequency DF2, or the third dithering frequency DF3. For example, the first dithering frequency DF1 may be 120 Hz, 60 Hz, or 48 Hz, the second dithering frequency DF2 may be 30 Hz, 24 Hz, or 15 Hz, and the third dithering frequency DF3 may be 10 Hz or 1 Hz. The second dithering frequency DF2 may be less (or lower) than the first dithering frequency DF1. The third dithering frequency DF3 may be less than the second dithering frequency DF2.

Figure 8:
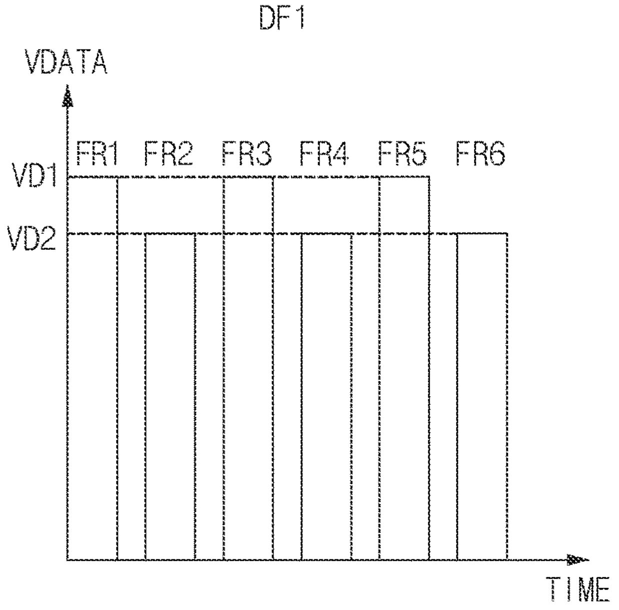
FIG. 8 is a diagram illustrating a dithering data voltage which alternately changes in units of one frame at a first dithering frequency of FIG. 7.
Figure 9:
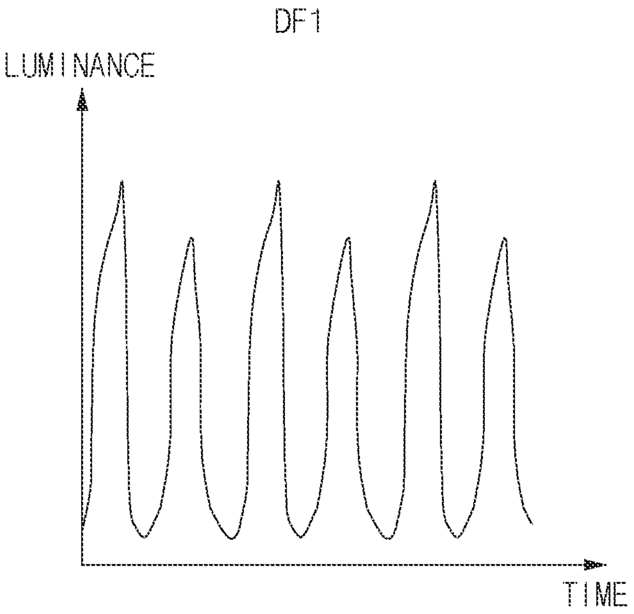
FIG. 9 is a diagram illustrating luminance of a display panel driven by a dithering data voltage of FIG. 8.

FIG. 8 is a diagram illustrating a dithering data voltage which alternately changes in units of one frame at a first dithering frequency of FIG. 7. FIG. 9 is a diagram illustrating luminance of a display panel driven by a dithering data voltage of FIG. 8.

Referring to FIGS. 8 and 9, in an embodiment, a display panel 100 may be driven at a first dithering frequency DF1 (e.g., 60 Hz). A first dithering data voltage VD1 and a second dithering data voltage VD2 may be alternately provided to the display panel 100 at the first dithering frequency DF1 in units of one frame.

For example, as shown in FIG. 8, the first dithering data voltage VD1 may be provided to the display panel 100 in a first frame FR1, the second dithering data voltage VD2 may be provided to 100 in a second frame FR2, the first dithering data voltage VD1 may be provided to the display panel 100 in a third frame FR3, the second dithering data voltage VD2 may be provided to the display panel 100 in a fourth frame FR4, the first dithering data voltage VD1 may be provided to the display panel 100 in a fifth frame FR5, and the second dithering data voltage VD2 may be provided to the display panel 100 in the sixth frame FR6.

In this case, as shown in FIG. 9, at the first dithering frequency DF1, when a blank period continues, luminance of the display panel 100 may decrease, and when an active period starts, the luminance of the display panel 100 may increase. Therefore, when a frame period changes from the blank period to the active period, luminance deviation of the display panel 100 may occur.

In some cases, the luminance deviation may increase depending on a dithering frequency at which the dithering operation is performed, and the luminance deviation may cause flicker, which is perceived by the user.

However, the flicker may not be visible due to the luminance deviation at the first dithering frequency DF1. For example, the first dithering frequency DF1 may be great (or high) enough not to be recognized as the flicker by the user. For example, since the blank period at the first dithering frequency DF1 is short, the luminance of the display panel 100 may decrease slightly when the blank period continues. Therefore, the luminance deviation may be substantially little, and the flicker may not be visible due to the luminance deviation.

Figure 10:
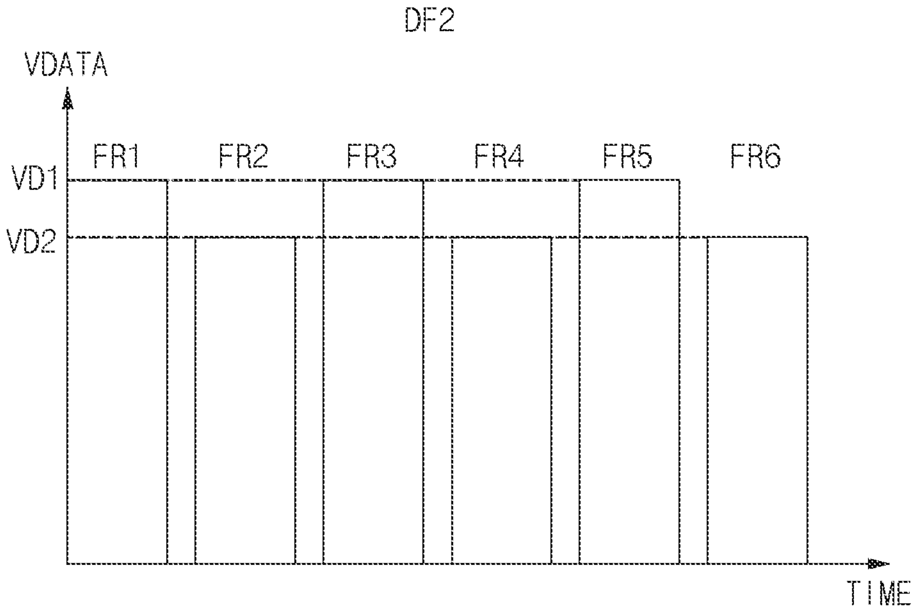
FIG. 10 is a diagram illustrating a dithering data voltage which alternately changes in units of one frame at a second dithering frequency of FIG. 7.
Figure 11:
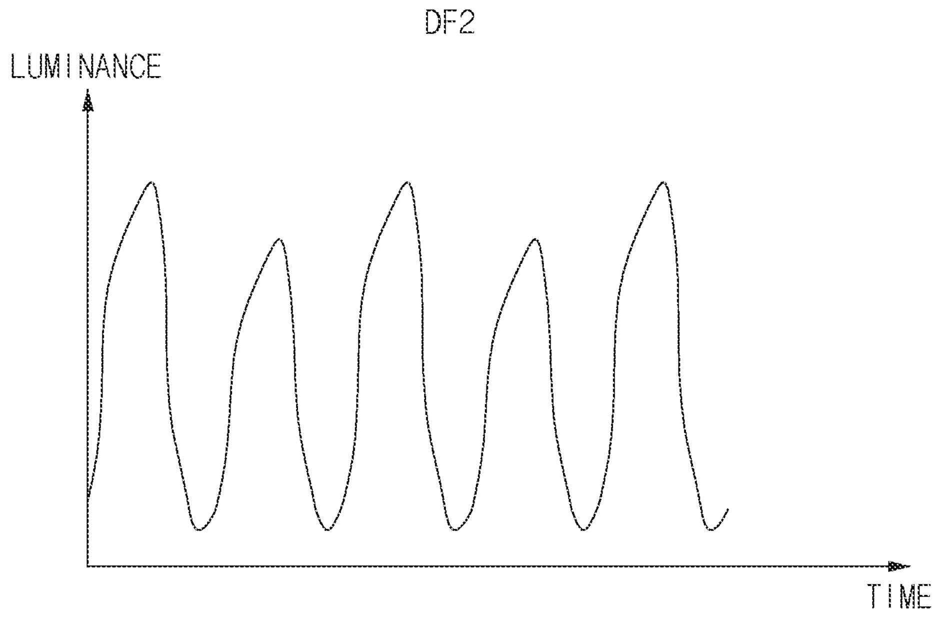
FIG. 11 is a diagram illustrating luminance of a display panel driven by a dithering data voltage of FIG. 10.

FIG. 10 is a diagram illustrating a dithering data voltage which alternately changes in units of one frame at a second dithering frequency of FIG. 7. FIG. 11 is a diagram illustrating luminance of a display panel driven by a dithering data voltage of FIG. 10.

Referring to FIGS. 10 and 11, in an embodiment, a display panel 100 may be driven at a second dithering frequency DF2 (e.g., 30 Hz). At the second dithering frequency DF2, a first dithering data voltage VD1 and a second dithering data voltage VD2 may be alternately provided to the display panel 100 in units of one frame.

For example, as shown in FIG. 10, the first dithering data voltage VD1 may be provided to the display panel 100 in a first frame FR1, the second dithering data voltage VD2 may be provided to 100 in a second frame FR2, the first dithering data voltage VD1 may be provided to the display panel 100 in a third frame FR3, the second dithering data voltage VD2 may be provided to the display panel 100 in a fourth frame FR4, the first dithering data voltage VD1 may be provided to the display panel 100 in a fifth frame FR5, and the second dithering data voltage VD2 may be provided to the display panel 100 in the sixth frame FR6.

In this case, as shown in FIG. 11, at the second dithering frequency DF2, when a blank period continues, luminance of the display panel 100 may decrease and when an active period starts, the luminance of the display panel 100 may increase. Therefore, when a frame period changes from the blank period to the active period, luminance deviation of the display panel 100 may occur.

Unlike at the first dithering frequency DF1, flicker may be visible due to the luminance deviation at the second dithering frequency DF2. For example, since the blank period at the second dithering frequency DF2 is sufficiently long, the luminance of the display panel 100 may sufficiently decrease when the blank period continues. Therefore, the luminance deviation may be substantially great, and the flicker may be visible due to the luminance deviation.

Figure 12:
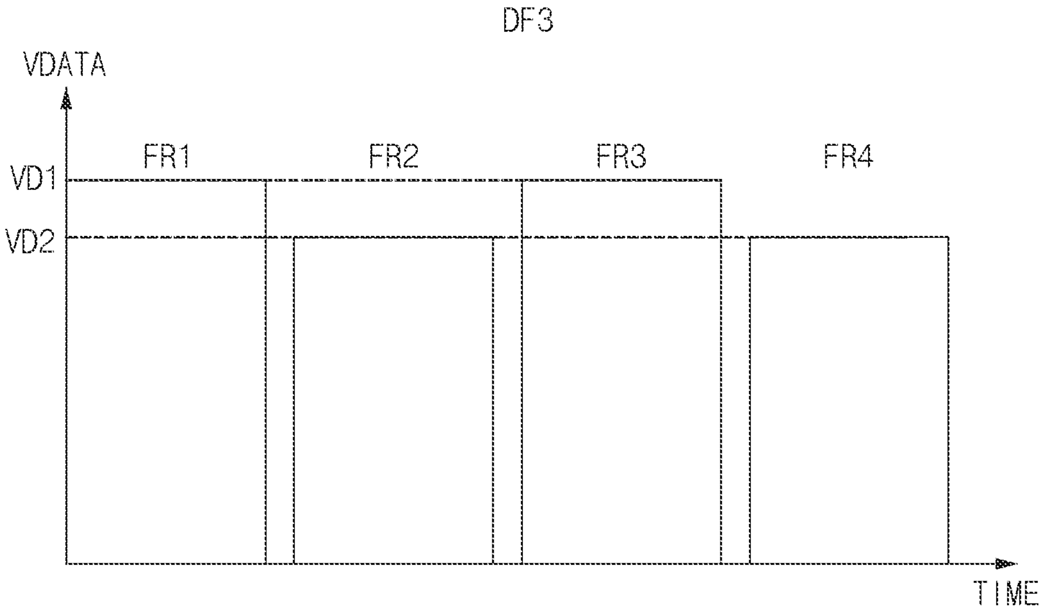
FIG. 12 is a diagram illustrating a dithering data voltage which changes alternately in units of one frame at a third dithering frequency of FIG. 7.
Figure 13:
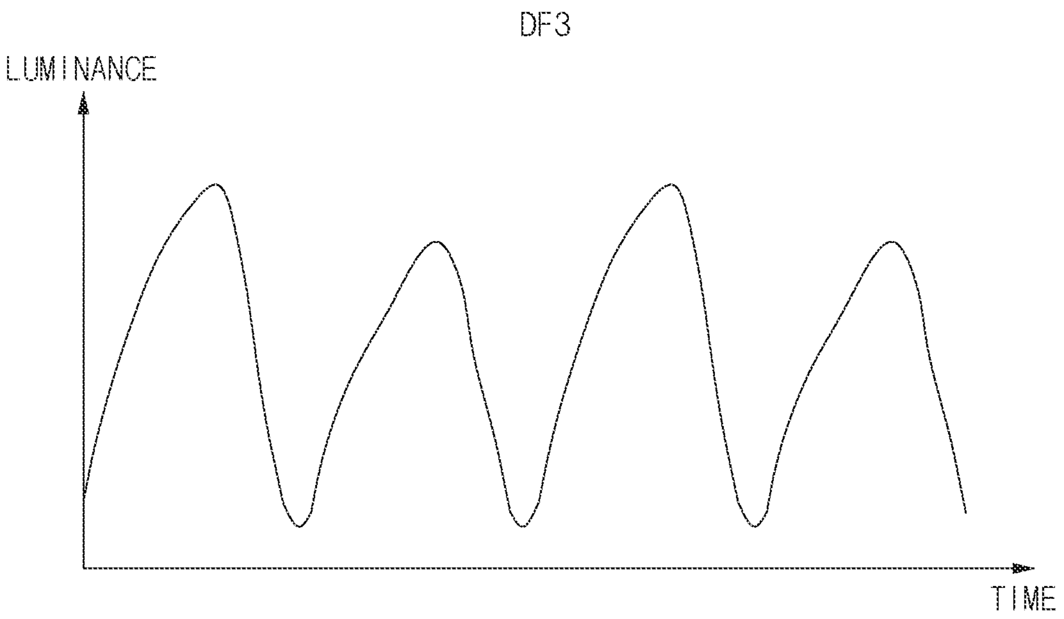
FIG. 13 is a diagram illustrating luminance of a display panel driven by a dithering data voltage of FIG. 12.

FIG. 12 is a diagram illustrating a dithering data voltage which changes alternately in units of one frame at a third dithering frequency of FIG. 7. FIG. 13 is a diagram illustrating luminance of a display panel driven by a dithering data voltage of FIG. 12.

Referring to FIGS. 12 and 13, in an embodiment, a display panel 100 may be driven at a third dithering frequency DF3 (e.g., 10 Hz). At the third dithering frequency DF3, a first dithering data voltage VD1 and a second dithering data voltage VD2 may be alternately provided to the display panel 100 in units of one frame.

For example, the first dithering data voltage VD1 may be provided to the display panel 100 in a first frame FR1, the second dithering data voltage VD2 may be provided to the display panel 100 in a second frame FR2, the first dithering data voltage VD1 may be provided to the display panel 100 in a third frame FR3, and the second dithering data voltage VD2 may be provided to the display panel 100 in a fourth frame FR4.

In this case, as shown in FIG. 13, at the third dithering frequency DF3, when a blank period continues, luminance of the display panel 100 may decrease, and when an active period starts, the luminance of the display panel 100 may increase. Therefore, when a frame period changes from the blank period to the active period, luminance deviation of the display panel 100 may occur.

Unlike at the second dithering frequency DF2, flicker may not be visible due to the luminance deviation at the third dithering frequency DF3. For example, when the blank period at the third dithering frequency DF3 continues, the luminance of the display panel 100 may sufficiently decrease. However, unlike the second dithering frequency DF2, the third dithering frequency DF3 is relatively little or low, so that the flicker due to the luminance deviation of the display panel 100 may not be visible.

That is, a flicker value (or flicker degree) at the first dithering frequency DF1 and a flicker value at the third dithering frequency DF3 may be less than a flicker value at the second dithering frequency DF2. The flicker value may be degree to which the flicker is recognized by the user. For example, the greater the flicker value, the more clearly the flicker may be perceived by the user.

In an embodiment, as described above, when the display panel 100 is driven at the second dithering frequency DF2 rather than the first dithering frequency DF1 and the third dithering frequency DF3, the flicker due to luminance deviation of the display panel 100 may be visible.

Figure 14:
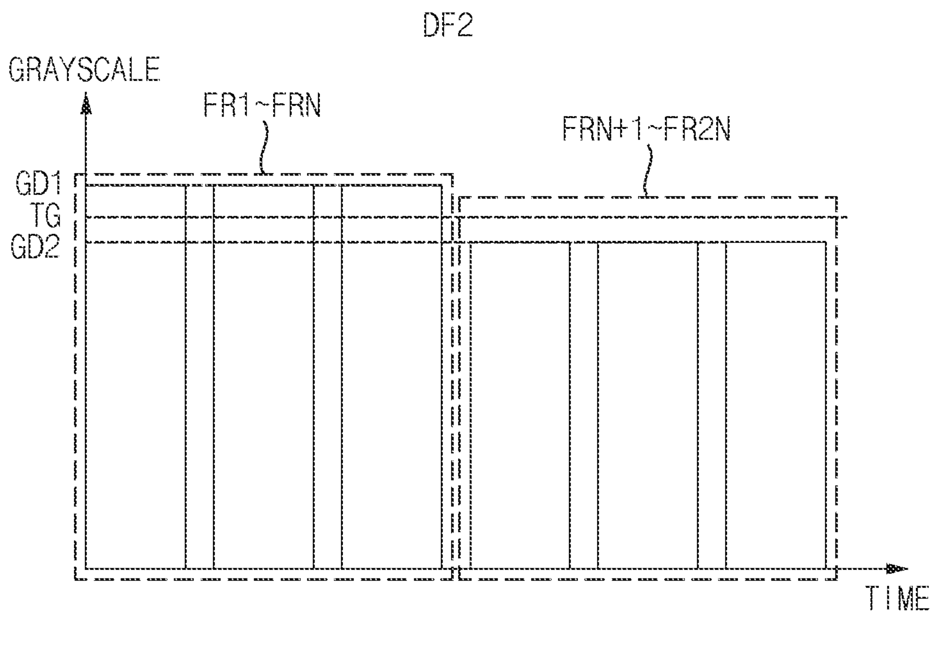
FIG. 14 is a diagram illustrating a dithering grayscale which alternately changes in units of N frames at a second dithering frequency of FIG. 7.
Figure 15:
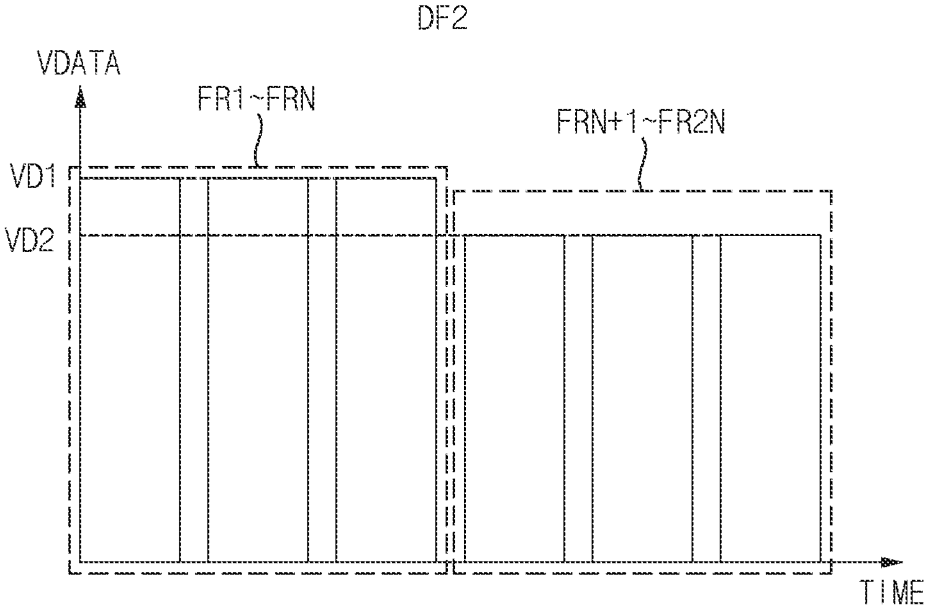
FIG. 15 is a diagram illustrating a dithering data voltage corresponding to a dithering grayscale of FIG. 14.
Figure 16:
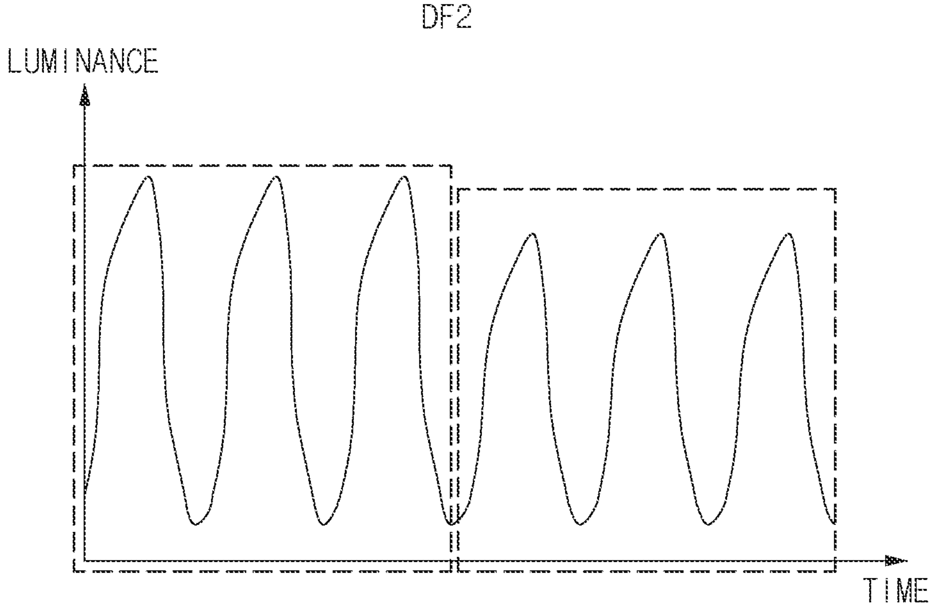
FIG. 16 is a diagram illustrating luminance of a display panel driven by a dithering data voltage of FIG. 15.

FIG. 14 is a diagram illustrating a dithering grayscale which alternately changes in units of N frames at a second dithering frequency of FIG. 7. FIG. 15 is a diagram illustrating a dithering data voltage corresponding to a dithering grayscale of FIG. 14. FIG. 16 is a diagram illustrating luminance of a display panel driven by a dithering data voltage of FIG. 15.

Referring to FIGS. 14 to 16, a display device 10 according to embodiments of the invention may alternately change a dithering grayscale GD1, GD2 in units of one frame (or every one frame) when a dithering operation is performed at a first dithering frequency DF1 or a third dithering frequency DF3, as described above with reference to FIGS. 8 to 11. The display device 10 may alternately change the dithering grayscale GD1, GD2 in units of N frames (or every N frames where N is a natural number of 2 or greater) when the dithering operation is performed at a second dithering frequency DF2.

In an embodiment, for example, when the dithering operation is performed at the first dithering frequency DF1 or the third dithering frequency DF3, the dithering grayscale GD1, GD2 may be a first dithering grayscale GD1 in a first frame FR1, and may be a second dithering grayscale GD2, which is different from the first dithering grayscale GD1, in a second frame FR2. In an embodiment, for example, when the dithering operation is performed (or set to be performed) at the second dithering frequency DF2, the dithering grayscale GD1, GD2 may be the first dithering grayscale GD1 in first to N-th frames 1, . . . , FRN, and may be the second dithering grayscale GD2 in (N+1)-th to 2N-th frames FRN+1, . . . , FR2N.

When the dithering grayscale GD1, GD2 alternately changes in units of N frames, a dithering data voltage VD1, VD2 corresponding to the dithering grayscale GD1, GD2 may alternately change in units of N frames.

For example, when the dithering operation is performed at the first dithering frequency DF1 or the third dithering frequency DF3, the dithering data voltage VD1, VD2 may be a first dithering data voltage VD1 in the first frame FR1, and may be a second dithering data voltage VD2, which is different from the first dithering data voltage VD1, in the second frame FR2. For example, when the dithering operation is performed (or set to be performed) at the second dithering frequency DF2, the dithering data voltage VD1, VD2 may be the first dithering data voltage VD1 in the first to N-th frames 1, . . . , FRN, may be the second dithering data voltage VD2 in the (N+1)-th to 2N-th frames FRN+1, . . . , FR2N.

When the dithering operation is performed (or set to be performed) at the second dithering frequency DF2 and the dithering data voltage VD1, VD2 alternately changes in units of N frames, the dithering frequency of the dithering operation at the second dithering frequency DF2 may be substantially reduced by 1/N times the second dithering frequency DF2. For example, when the second dithering frequency DF2 is set as 30 Hz and N is 3, the dithering frequency of the dithering operation at the second dithering frequency DF2 may be substantially reduced by a factor of ⅓ and may become the third dithering frequency DF3 of 10 Hz.

In such an embodiment, as described above, when the dithering data voltage VD1, VD2 alternately changes from one to the other in units of N frames, the dithering frequency of the dithering operation at the second dithering frequency DF2 may be substantially reduced by 1/N times the second dithering frequency DF2 without changing the second dithering frequency DF2.

Therefore, the flicker value when the dithering data voltage VD1, VD2 alternately changes in units of N frames at the second dithering frequency DF2 may be less than a flicker value when the dithering data voltage VD1, VD2 alternately changes in units of one frame at the second dithering frequency DF2.

Additionally, the dithering data voltage VD1, VD2 may be provided to the display panel 100 in each of N frames. Therefore, even if a blank period of each of N frames continues and luminance of the display panel 100 decreases, when an active period of each of N frames starts, the luminance of the display panel 100 may increase.

Accordingly, luminance deviation of the display panel 100 when a frequency equal to 1/N times the second dithering frequency DF2 is implemented in N frames may be less than luminance deviation of the display panel 100 when the frequency equal to 1/N times the second dithering frequency DF2 is implemented in the one frame.

Figure 17:
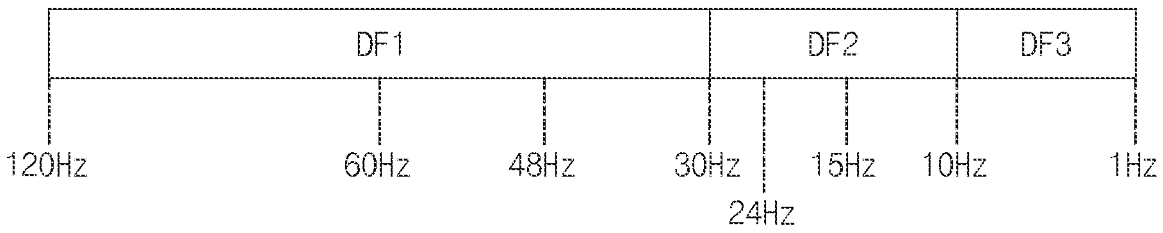
FIG. 17 is a diagram illustrating an example of a dithering frequency.
Figure 18:
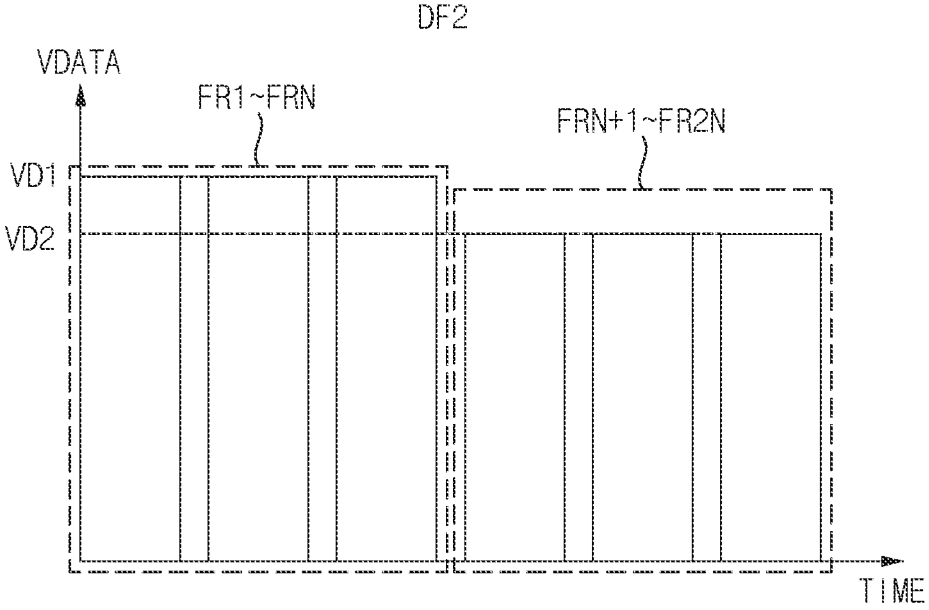
FIG. 18 is a conceptual diagram illustrating an example of N frames in a unit according to a second dithering frequency of FIG. 17.
Figure 19:
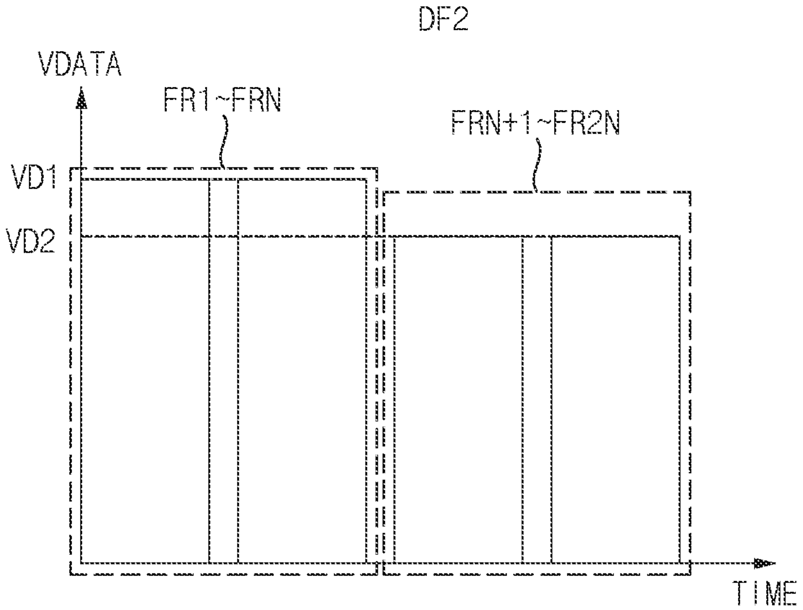
FIG. 19 is a conceptual diagram illustrating an example of N frames in a unit according to a second dithering frequency of FIG. 17.

FIG. 17 is a diagram illustrating an example of a dithering frequency. FIG. 18 is a conceptual diagram illustrating an example of N frames in a unit according to a second dithering frequency of FIG. 17. FIG. 19 is a conceptual diagram illustrating an example of N frames in a unit according to a second dithering frequency of FIG. 17.

Referring to FIGS. 17 to 19, in an embodiment, when a second dithering frequency DF2 decreases, the value of N (i.e., the number of frames in a unit of change in the second dithering frequency) may decrease.

In an embodiment, for example, the second dithering frequency DF2 may be 30 Hz, 24 Hz, or 15 Hz. In an embodiment, for example, when the second dithering frequency DF2 is 30 Hz and N is 3 as shown in FIG. 18, the second dithering frequency DF2 may be substantially reduced by a factor of ⅓ and may become a third dithering frequency DF3 of 10 Hz. In an embodiment, for example, when the second dithering frequency DF2 is 15 Hz and N is 2 as shown in FIG. 19, the second dithering frequency DF2 may be substantially reduced by a factor of ½ and may become the third dithering frequency DF3 of 7.5 Hz.

Figure 20:
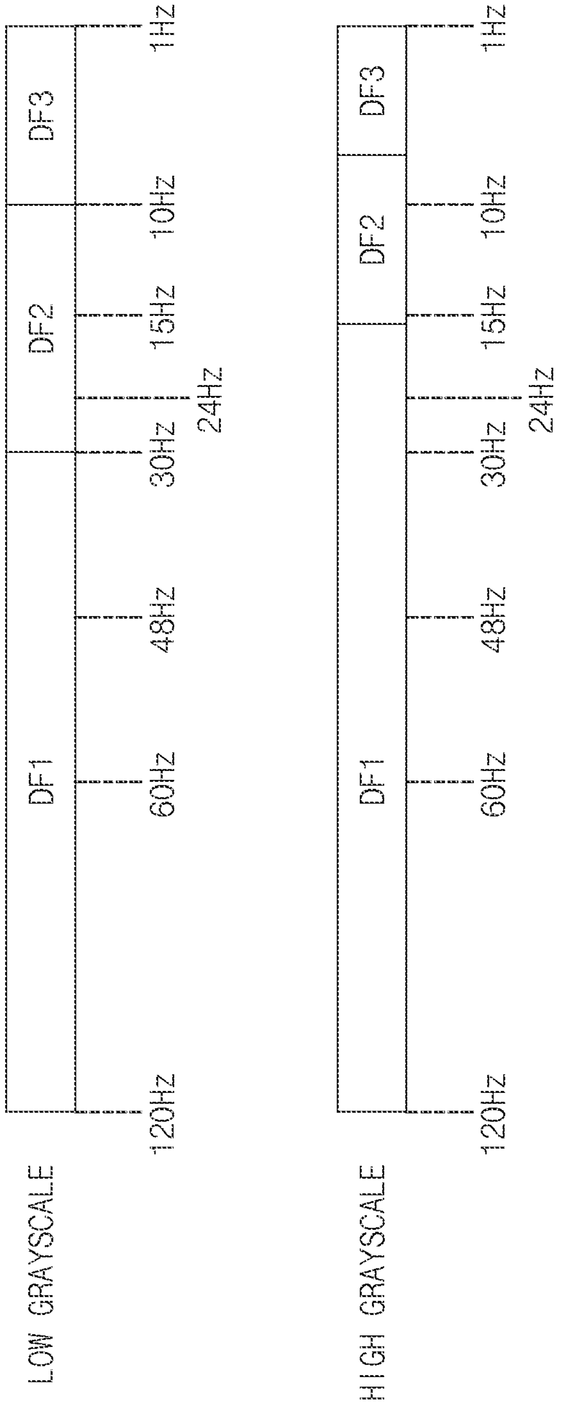
FIG. 20 is a diagram illustrating an example of a dithering frequency according to a grayscale of input image data.

FIG. 20 is a diagram illustrating an example of a dithering frequency according to a grayscale of input image data.

Referring to FIG. 20, in an embodiment, when a grayscale of input image data IMG changes, a first dithering frequency DF1, a second dithering frequency DF2, and a third dithering frequency DF3 may change. When the grayscale of the input image data IMG is high grayscale, flicker may be visible at a low dithering frequency and within a narrow range of the low dithering frequency. When the grayscale of the input image data IMG is low grayscale, the flicker may be visible at a high dithering frequency and within a wide range of the high dithering frequency.

In an embodiment, for example, luminance deviation between luminance corresponding to 9 grayscale and luminance corresponding to 11 grayscale may be perceived more clearly by the user than luminance difference between luminance corresponding to 249 grayscale and luminance corresponding to 251 grayscale. That is, when the grayscale of the input image data IMG increases, luminance deviation visible to the user may decrease.

Therefore, in an embodiment, when the grayscale of the input image data IMG increases, the second dithering frequency DF2 may decrease. In an embodiment, when the grayscale of the input image data IMG increases, difference between the maximum frequency of the second dithering frequency DF2 and the minimum frequency of the second dithering frequency DF2 may decrease.

Figure 21:
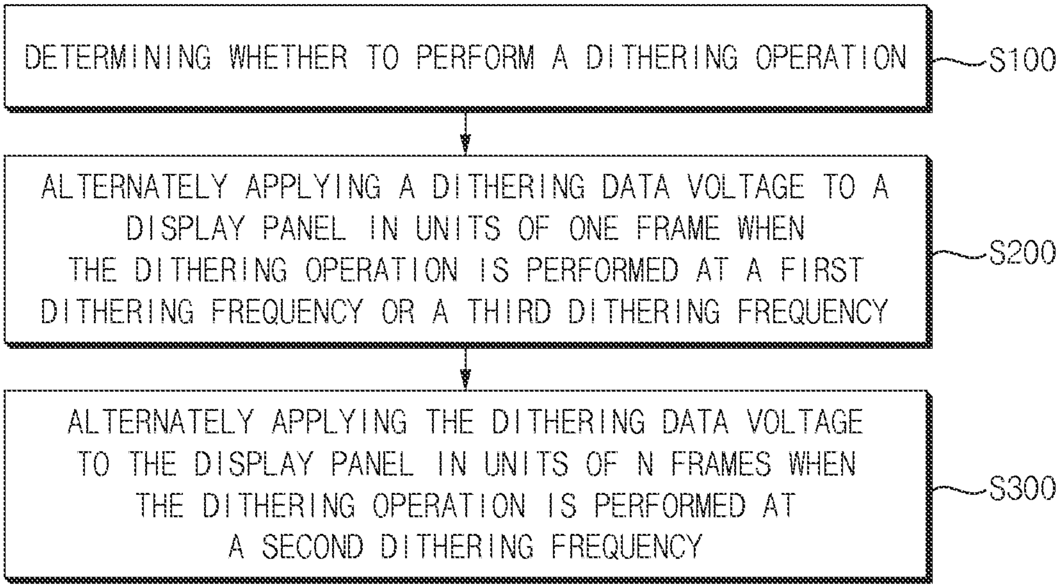
FIG. 21 is a flowchart illustrating a method of driving a display device according to embodiments of the invention.

FIG. 21 is a flowchart illustrating a method of driving a display device according to embodiments of the invention.

A display device 10 in an embodiment of a method of FIG. 21 is substantially to the same as the display device 10 of FIG. 1. Therefore, any repetitive detailed descriptions of the same or like elements as those of the display device 10 of FIG. 1 may be omitted or simplified.

Referring to FIG. 21, a method of driving a display device 10 according to embodiments of the invention may include determining whether to perform a dithering operation of applying a dithering data voltage VD1, VD2 to a display panel 100 based on input image data IMG (S100), alternately applying the dithering data voltage VD1, VD2 to the display panel 100 in units of one frame when the dithering operation is performed at a first dithering frequency DF1 or a third dithering frequency DF3, which is smaller than the first dithering frequency DF1, (S200), and alternately applying the dithering data voltage VD1, VD2 to the display panel 100 in units of N frames (where N is a natural number of 2 or greater) when the dithering operation is performed (or set to be performed) at a second dithering frequency DF,2 which is smaller than the first dithering frequency DF1 and greater than the third dithering frequency DF3 (S300).

In an embodiment, a flicker value of the first dithering frequency DF1 and a flicker value of the third dithering frequency DF3 may be greater than a flicker value of the second dithering frequency DF2.

In an embodiment, when N increases, the flicker value of the second dithering frequency DF2 may decrease.

In an embodiment, when the dithering operation is performed (or set to be performed) at the second dithering frequency DF2, the dithering data voltage VD1, VD2 may be the first dithering data voltage VD1 in first to N-th frames FR1, . . . , FRN and may be the second dithering data voltage VD2, which is different from the first dithering data voltage VD1, in N+1-th to 2N-th frames.

In an embodiment, a target grayscale TG may be determined based on the first dithering data voltage VD1 and the second dithering data voltage VD2.

In an embodiment, a dithering data voltage corresponding to the target grayscale TG may be a voltage between the first dithering data voltage VD1 and the second dithering data voltage VD2.

In an embodiment, the first dithering data voltage VD1 is greater than the second dithering data voltage VD2.

In an embodiment, the second dithering data voltage VD2 may be greater than the first dithering data voltage VD1.

Figure 22:
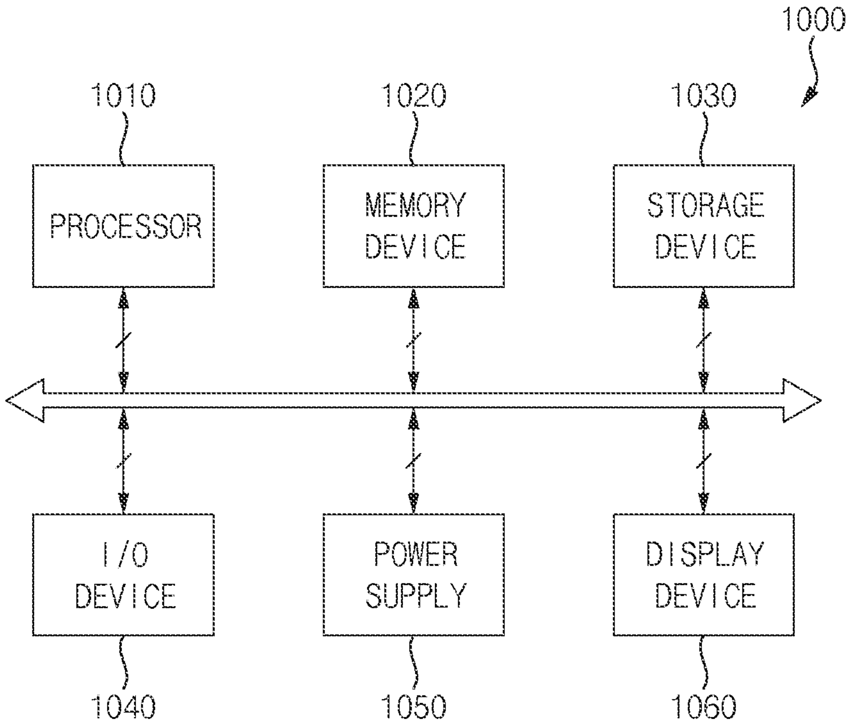
FIG. 22 is a block diagram illustrating an electronic device.
Figure 23:
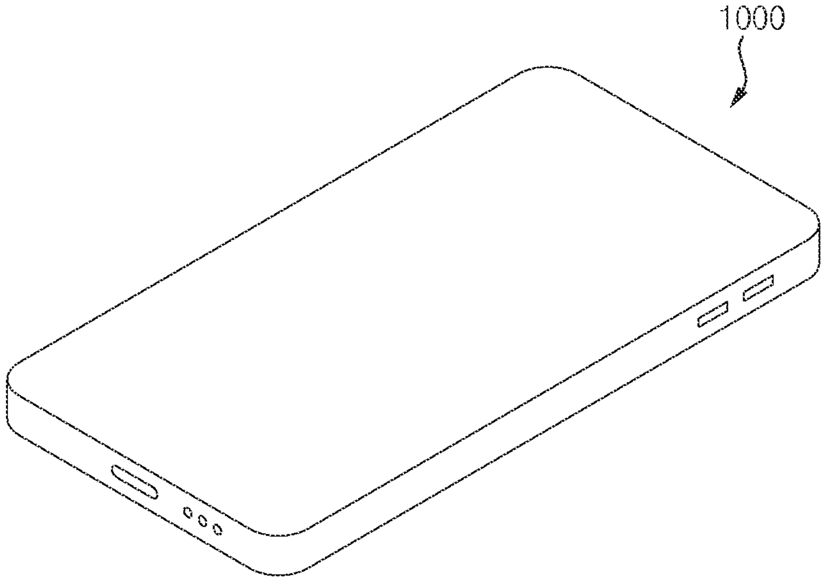
FIG. 23 is a diagram illustrating an embodiment in which the electronic device of FIG. 22 is implemented as a smart phone device.

FIG. 22 is a block diagram illustrating an electronic device. FIG. 23 is a diagram illustrating an embodiment in which the electronic device of FIG. 22 is implemented as a smart phone device.

Referring to FIGS. 22 and 23, an embodiment of the electronic device 1000 may include a processor 1010, a memory device 1020, a storage device 1030, an input/output (I/O) device 1040, a power supply 1050, and a display device 1060. The display device 1060 may correspond to the display device 10 of FIG. 1. In addition, the electronic device 1000 may further include a plurality of ports for communicating with a video card, a sound card, a memory card, a universal serial bus (USB) device, other electronic device, or the like.

In an embodiment, as illustrated in FIG. 23, the electronic device 1000 may be implemented as a smart phone. However, the electronic device 1000 is not limited thereto. For example, the electronic device 1000 may be implemented as a cellular phone, a video phone, a smart pad, a smart watch, a tablet personal computer (PC), a car navigation system, a computer monitor, a laptop, a head mounted display (HMD) device, or the like.

The processor 1010 may perform various computing functions. The processor 1010 may be a micro processor, a central processing unit (CPU), an application processor (AP), or the like. The processor 1010 may be coupled to other components via an address bus, a control bus, a data bus, or the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like.

The I/O device 1040 may include an input device such as a keyboard, a keypad, a mouse device, a touch-pad, a touch-screen, or the like, and an output device such as a printer, a speaker, or the like. In some embodiments, the I/O device 1040 may include the display device 1060.

The power supply 1050 may provide power for operations of the electronic device 1000.

The display device 1060 may be connected to other components through buses or other communication links.

The inventions may be applied to any display device and any electronic device including the touch panel. For example, the inventions may be applied to a mobile phone, a smart phone, a tablet computer, a digital television (TV), a three-dimensional (3D) TV, a PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
- a display panel including pixels;
- a data driver which applies a dithering data voltage to the display panel; and
- a driving controller which determines whether to perform a dithering operation of applying the dithering data voltage to the display panel based on input image data,
- wherein, when the dithering operation is performed at a first dithering frequency or a third dithering frequency, which is smaller than the first dithering frequency, the dithering data voltage is alternately applied to the display panel in units of one frame, and
- wherein, when the dithering operation is performed at a second dithering frequency, which is less than the first dithering frequency and greater than the third dithering frequency, the dithering data voltage is alternately applied to the display panel in units of N frames, wherein N is a natural number of 2 or greater,
- wherein, when the second dithering frequency decreases, a value of N decreases, and
- wherein, when the dithering data voltage is alternately applied to the display panel in units of N frames, a same dithering data voltage is applied to the display panel during N frames.

2. The display device of claim 1, wherein a flicker value of the first dithering frequency and a flicker value of the third dithering frequency are greater than a flicker value of the second dithering frequency.

3. The display device of claim 2, wherein, when N increases, the flicker value of the second dithering frequency decreases.

4. The display device of claim 1, wherein, when the dithering operation is performed at the second dithering frequency, the dithering data voltage is a first dithering data voltage in first to N-th frames and is a second dithering data voltage which is different from the first dithering data voltage in (N+1)-th to 2N-th frames.

5. The display device of claim 4, wherein a target grayscale is determined based on the first dithering data voltage and the second dithering data voltage.

6. The display device of claim 5, wherein a dithering data voltage corresponding to the target grayscale is a voltage between the first dithering data voltage and the second dithering data voltage.

7. The display device of claim 4, wherein the first dithering data voltage is greater than the second dithering data voltage.

8. The display device of claim 6, wherein the second dithering data voltage is greater than the first dithering data voltage.

9. The display device of claim 1, wherein, when a grayscale of the input image data changes, the first dithering frequency, the second dithering frequency and the third dithering frequency are changed.

10. The display device of claim 9, wherein, when the grayscale of the input image data increases, the second dithering frequency decreases.

11. The display device of claim 9, wherein, when the grayscale of the input image data increases, a difference between a maximum frequency of the second dithering frequency and a minimum frequency of the second dithering frequency decreases.

12. A method of driving a display device, the method comprising:
- determining whether to perform a dithering operation of applying a dithering data voltage to a display panel based on input image data;
- alternately applying the dithering data voltage to the display panel in units of one frame when the dithering operation is performed at a first dithering frequency or a third dithering frequency, which is less than the first dithering frequency; and
- alternately applying the dithering data voltage to the display panel in units of N frames when the dithering operation is performed at a second dithering frequency, which is less than the first dithering frequency and greater than the third dithering frequency, herein N is a natural number of 2 or greater,
- wherein, when the second dithering frequency decreases, a value of N decreases, and
- wherein, when the dithering data voltage is alternately applied to the display panel in units of N frames, a same dithering data voltage is applied to the display panel during N frames.

13. The method of claim 12, wherein a flicker value of the first dithering frequency and a flicker value of the third dithering frequency are greater than a flicker value of the second dithering frequency.

14. The method of claim 13, wherein, when a value of N increases, the flicker value of the second dithering frequency decreases.

15. The method of claim 12, wherein, when the dithering operation is performed at the second dithering frequency, the dithering data voltage is a first dithering data voltage in first to N-th frames and is a second dithering data voltage which is different from the first dithering data voltage in (N+1)-th to 2N-th frames.

16. The method of claim 15, wherein a target grayscale is determined based on the first dithering data voltage and the second dithering data voltage.

17. The method of claim 16, wherein a dithering data voltage corresponding to the target grayscale is a voltage between the first dithering data voltage and the second dithering data voltage.

18. The method of claim 15, wherein the first dithering data voltage is greater than the second dithering data voltage.

19. The method of claim 15, wherein the second dithering data voltage is greater than the first dithering data voltage.

* * * * *